United States Patent

Blair

[11] Patent Number: 6,130,759
[45] Date of Patent: Oct. 10, 2000

[54] REDUCING MEMORY FRAGMENTATION BY COALESCING AND REDISTRIBUTING PREVIOUSLY DISTRIBUTED PAGE STRIPS

[75] Inventor: Timothy P. Blair, Boise, Id.

[73] Assignee: Hewlett-Packard Company, Palo Alto, Calif.

[21] Appl. No.: 08/918,835
[22] Filed: Aug. 26, 1997
[51] Int. Cl.⁷ .................................. B41B 15/00
[52] U.S. Cl. ................ 358/1.17; 358/1.15; 358/1.16
[58] Field of Search ........................... 395/114, 115, 395/116, 110, 101, 100, 112; 711/171; 358/1.15, 1.17, 1.1, 1, 1.13, 1.16

[56] References Cited

U.S. PATENT DOCUMENTS

| | | | |
|---|---|---|---|
| 5,479,587 | 12/1995 | Campbell et al. ................ | 395/116 |
| 5,596,736 | 1/1997 | Kerns ................................ | 395/404 |
| 5,784,699 | 7/1998 | McMahon et al. ................. | 711/171 |

Primary Examiner—Edward L. Coles
Assistant Examiner—Twyler Lamb
Attorney, Agent, or Firm—Lane R. Simmons

[57] ABSTRACT

Fragmentation is reduced in a memory of an image transfer device by coalescing segments of rasterized, compressed and distributed page strips into preallocated buffers, and then redistributing the strips back into the memory such that smaller holes in the memory are filled before larger holes. Alternatively, the rasterized and compressed page strips are stored directly into preallocated buffers before ever being distributed into memory. Then, when the buffers are filled, the strips are distributed into the memory such that smaller holes in the memory are filled before larger holes.

18 Claims, 4 Drawing Sheets

REDUCING MEMORY FRAGMENTATION BY COALESCING AND REDISTRIBUTING PREVIOUSLY DISTRIBUTED PAGE STRIPS

FIELD OF THE INVENTION

This invention relates in general to image transfer devices and, more particularly, to reducing memory fragmentation in a printing device.

BACKGROUND OF THE INVENTION

In printers that employ laser engines as the "print mechanism", data must be provided at a speed that is fast enough to keep up with the print action (which can be measured by the rate of movement of the paper past the imaging drum). In such printers, formatting is either performed on the host computer, with large volumes of rasterized image data shipped to the printer at high speed, or on a formatter within the printer itself. Since a conventional laser printer engine operates at a constant speed, if rasterized image data is not available when a previous segment of image data has been imprinted, a "print overrun" occurs and the page is not printable.

Several methods have been used in the prior art to avoid print overruns. First, a full raster bit map of an entire page may be stored in the printer so that the print mechanism always has rasterized data awaiting printing. However, this solution requires large amounts of random access memory (RAM) for each page. A second method for assuring the availability of print data to a laser printer is to construct a display list from the commands describing a page. During formatting, a page description received from a host is converted into a series of simple commands, called display commands, that describe what must be printed. The display commands are parsed and sorted according to their vertical position on the page. The page is then logically divided into sections called page strips, which page strips are then individually rendered into a raster bit map and passed to the print engine for printing. This procedure enables lesser amounts of RAM to be used for the print image.

When the display commands are rendered at a fast enough pace, the same memory used to store a first page strip can be reused for a subsequent page strip further down the page. For example, in certain prior art printers it is known to employ three raster buffers for storing page strips. During page processing, the first buffer is reused for a fourth strip on the page, the second is reused for a fifth strip, etc. However, under standard (generally maximum) page-per-minute performance, little time is left between finishing printing of a strip and when a next strip is required to be rasterized from the same print buffer.

Under certain circumstances, "complex" page strips will include many display commands and require a longer than normal time for rasterization. Additionally, to rasterize a page strip (whether "complex" or not), more memory space may be required than is currently available—depending upon several factors associated with the printer, including memory size, job to be printed, and other printer system activities. In the case of a complex strip, rasterization time may increase to such an extent that the succeeding strip can not be delivered on time, thus causing a print overrun to occur. In the case of insufficient memory space being allocable for a strip, a print overrun will also occur.

In the event of low available memory for processing print commands, each page strip of a page may be reevaluated and passed through several steps in attempt to reduce memory allocation requirements and free up more memory. For example, each page strip may be rasterized and compressed using one of several compression techniques. U.S. Pat. No. 5,479,587 describes a Page Printer Having Adaptive Data Compression for Memory Minimization and is incorporated herein by reference in full. After a page strip is rasterized and compressed, the memory allocation requirement for that strip is determined. If the memory allocation requirement is less than the memory allocation requirement of the display list for that same strip (relative to a predetermined comparison threshold), then the rasterized and compressed version will be used and stored in memory rather than the display list. On the other hand, if the rasterized and compressed strip's memory allocation requirement is not less than the memory allocation requirement for its display list (per the threshold), then the strip may be processed again using a different compression technique. These steps of rasterizing a strip, compressing it, comparing the size of the compressed version to the display list, and determining if the memory allocation requirement of the compressed version is less than that of the display list, may be repeated multiple times using differing compression techniques and/or thresholds until the strip's allocation requirement is less than that of its display list.

When it is determined that the threshold has been met (i.e., the rasterized and compressed page strip memory allocation requirement is less than that of the display list), then the strip's display list is deallocated from memory and the rasterized and compressed page strip is stored to memory. The page strip is stored in memory by being dissected into fragments (segments) and then linked and distributed into "holes" in the memory. The "holes" are, typically, smaller isolated free areas of memory surrounded by larger unavailable (used) areas.

Once all of the page strips have been rasterized, compressed, evaluated and distributed (when the threshold was met) then processing of the print commands resumes at the point where the event of low available memory was previously detected (i.e., the point that initiated the reevaluation process for the page). The page strip that was previously attempting a memory allocation (but detected the low available memory event) should now have a better chance of being able to satisfy its memory allocation.

Although these page strip processing techniques often enable a page strip memory allocation request to be satisfied, fragmentation of the memory may not be reduced. Fragmentation may not be reduced because each strip is processed independently of all other strips. For example, if a first strip is rasterized, distributed and stored, and then some memory surrounding a distributed segment of that first strip is subsequently deallocated, then the first strip ends up actually causing fragmentation in the memory since it remains there even after its surrounding areas were deallocated. This scenario may occur, for example, if a segment of the first strip was stored in a hole that was created by a second strip's display list, and then the second strip's display list was removed from around the first strip in order to render the second strip's rasterized and compressed page strip. Disadvantageously, if the memory becomes too fragmented (i.e., too many "holes" exist) such that other memory allocation requests cannot be satisfied that require contiguous allocations of memory, then overall page processing is crippled and a print overrun may result.

Accordingly, an object of the present invention is to reduce memory fragmentation in a page printer memory.

SUMMARY OF THE INVENTION

According to principles of the present invention in a preferred embodiment, fragmentation is reduced in a memory of an image transfer device by coalescing segments of rasterized, compressed and distributed page strips into preallocated buffers, and then redistributing the rasterized and compressed strips back into the memory such that smaller holes in the memory are filled before larger holes.

In an alternate embodiment, the rasterized and compressed page strips are stored directly into preallocated buffers before ever being distributed into memory. Then, when the buffers are filled, the strips are distributed into the memory such that smaller holes in the memory are filled before larger holes.

Other objects, advantages, and capabilities of the present invention will become more apparent as the description proceeds.

DETAILED DESCRIPTION OF THE INVENTION

Figure 1:
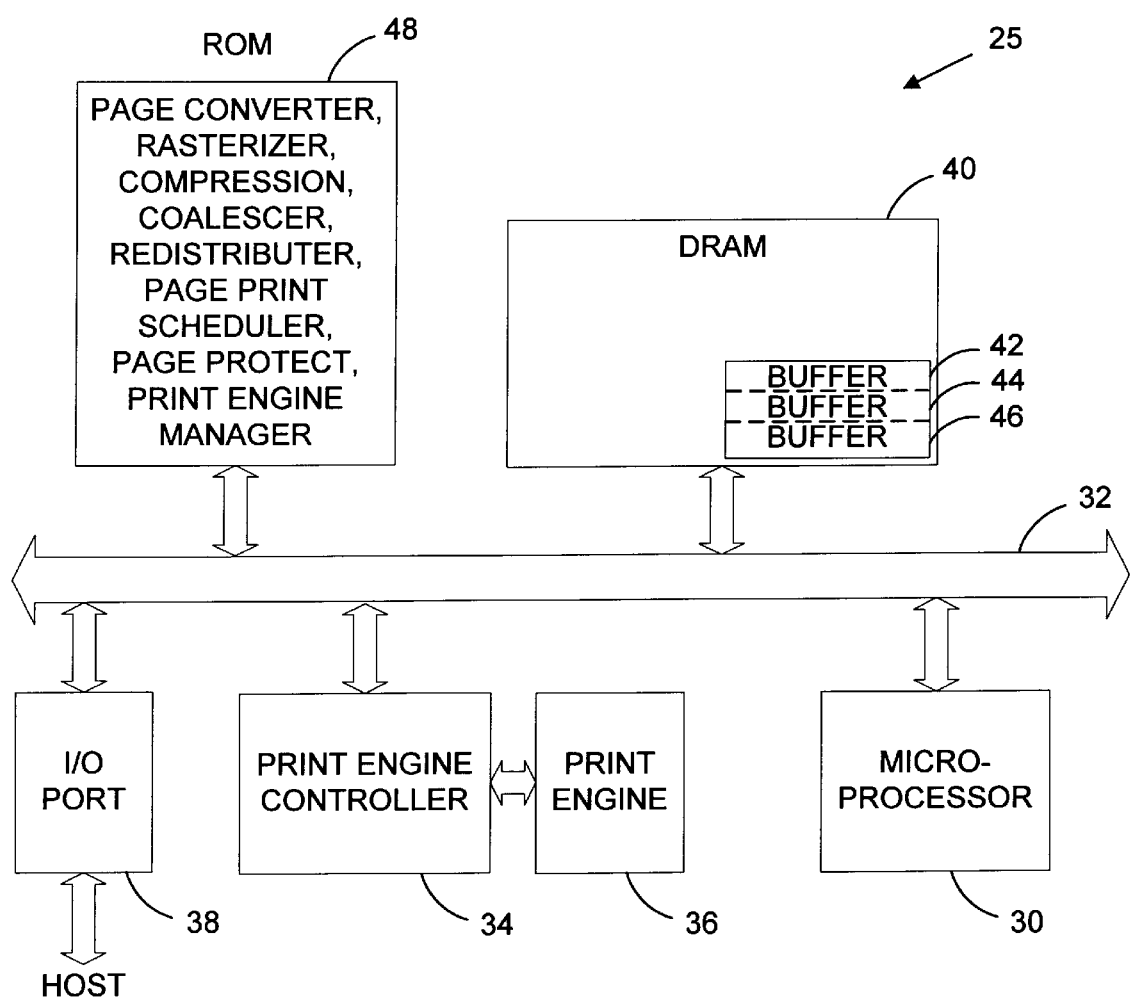
FIG. 1 is a block diagram of a printer embodying the present invention system and method for reducing memory fragmentation by coalescing and redistributing previously distributed rasterized page strips.

FIG. 1 is a high level block diagram of a page printer 25 incorporating the present invention for reducing memory fragmentation. Page printer 25 is controlled by a microprocessor 30 which communicates with other elements of the system via bus 32. A print engine controller 34 and associated print engine 36 connect to bus 32 and provide the print output capability for the page printer. Print engine 36 is preferably a laser printer that employs an electrophotographic drum imaging system, as well known in the art.

An input/output (I/O) port 38 provides communications between the page printer and a host computer and receives page descriptions from the host for processing within the page printer. A dynamic random access memory (DRAM) 40 provides a main memory for the page printer. A portion of DRAM 40 includes three (in this example) pre-allocated buffers 42, 44 and 46 (hereinafter 42–46) which are employed during page strip processing. These buffers may be video buffers or some other pre-allocated buffers. During the print process, each pre-allocated buffer receives a selected page strip's rasterized image data for storing and passing the same to print engine controller 34 and print engine 36. Only after one of the buffers 42, 44 or 46 becomes available (i.e., the page strip's rasterized data is transferred/imaged onto the drum), can a next page strip of rasterized data be inserted.

A read only memory (ROM) 48 holds firmware which controls the operation of microprocessor 30 and the page printer. The code procedures stored in ROM 48 may include the following: a page converter, rasterizer, compression code, page print scheduler (including a page protect feature) and print engine manager. ROM 48 further includes a coalescer and redistributer according to the present invention. The page converter firmware converts a page description received from the host to a display command list. As discussed, each display command defines an object to be printed on the page. The rasterizer firmware converts each display command to an appropriate bit map (rasterized strip) and distributes the bit map into memory 40. The compression firmware compresses the rasterized strips in the event insufficient memory exists in memory 40 for holding the rasterized strips. The coalescer coalesces the compressed, rasterized and distributed page strips, and the redistributer redistributes those page strips according to the present invention as will be described more fully herein.

When a page is closed for processing (i.e., all strips have been evaluated, rasterized, compressed, etc. for processing by print engine 36) then the rasterized strips are stored in one of the pre-allocated buffers 42–46 and subsequently passed to print engine 36 by print engine controller 34, thereby enabling the generation of an image (i.e., text/graphics etc). The page print scheduler controls the sequencing and transferring of page strip buffers to print engine controller 34. Within the page print scheduler is page protection firmware which assures that print overruns do not occur during the processing of a page. The print engine manager controls the operation of print engine controller 34 and, in turn, print engine 36.

The operation of page printer 25 commences when it receives a page description from a host computer via I/O port 38. The page description is placed in DRAM 40. Microprocessor 30 accesses the page description, line by line, and builds a display command list using the page converter firmware in ROM 48. As discussed, the display command list is a set of commands that describe what must be printed and forms an intermediate description of the page. As the display command list is being produced, the display commands are sorted by location on the page and allocated to page strips. Each page strip is subsequently converted to and stored as a rasterized bit map in one of the buffers 42–46 for use by print engine 36.

However, as previously described, in the event of low available memory 40 for processing the display commands and allocation of the same to a page strip, each strip for (which an allocation of memory is not satisfied) is rasterized and compressed in order to reduce the memory allocation requirement as much as possible. Each of those strips rasterized and compressed strips is then dissected into linked fragments and distributed into holes in memory 40 as will be discussed more fully with respect to FIGS. 2A–C.

Therefore, referring now to FIGS. 2A–C, and subsequently 3A–C, block diagrams depicting a representation of memory 40 are shown. For each FIG. 2A–C and 3A–C, coordinate references 50 and 55 are shown in the drawings simply for discussion purposes and are not part of memory 40. Coordinate references 50 and 55 are used to identify X/Y (column/row) coordinate reference locations in memory 40 for discussion purposes herein. Used portions of memory 40 are designated with solid black, free portions (holes) of memory 40 are designated with white spaces, and each distributed rasterized page strip within memory 40 is designated with an alphabetic character (the multiple same alphabetic characters representing separate linked segments of the same distributed page strip). Not all portions of memory 40 are labeled simply to avoid cluttering of the diagram and to more clearly depict the present invention.

Figure 2A:
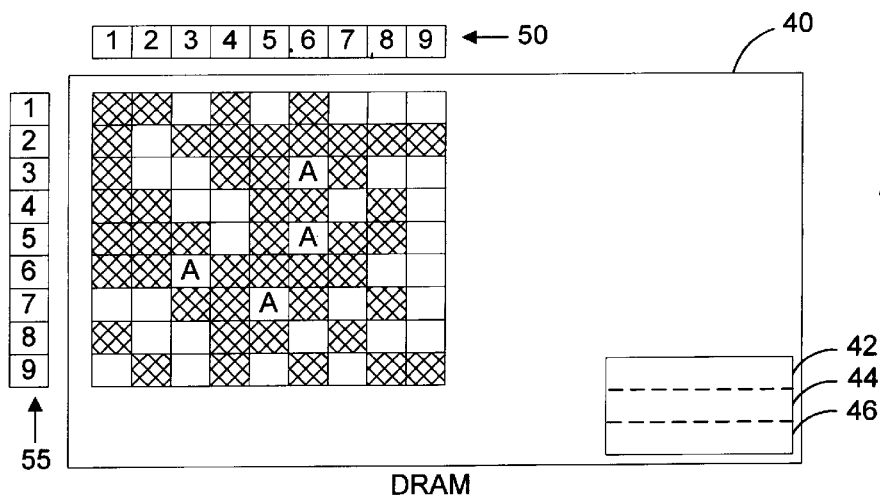
FIGS. 2A–C are block diagrams representing a memory having distributed rasterized page strips.

Turning now to FIG. 2A, memory 40 is depicted at a first instance in time having one rasterized and compressed page strip "A" distributed and linked therein. Strip "A" is distributed into free spaces at X/Y coordinate reference locations 6/3, 6/5, 3/6, and 5/7. Strip "A" is linked, but the links are not shown for clarity of drawing purposes.

Figure 2B:
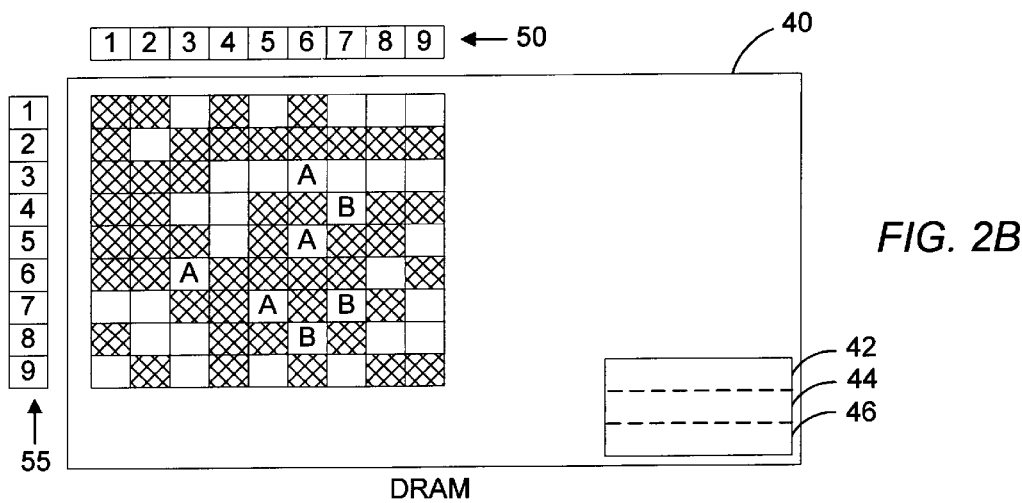

FIG. 2B depicts memory 40 at a second instance in time wherein a second rasterized and compressed page strip "B" has also been distributed and linked therein at holes identified at coordinate reference locations 7/4, 7/7, and 6/8. Strip "A" remains where it was. However, it will be noted, now, that previously used memory portions 4/3, 5/3, and 7/3 have become free portions (holes). This may have occurred for any number of reasons. For example, the display list from which rasterized page strip "B" was created may have occupied those memory portions prior to being rasterized. Alternatively, some other operating system function associated with printer 25 may have freed up those resources. In any case, whatever the reason for locations 4/3, 5/3, and 7/3 now being freed up, it is clear that distributed segment "A" at location 6/3 is fragmenting what could be a much larger free space in row 3 with respect to column locations 4–9.

Figure 2C:
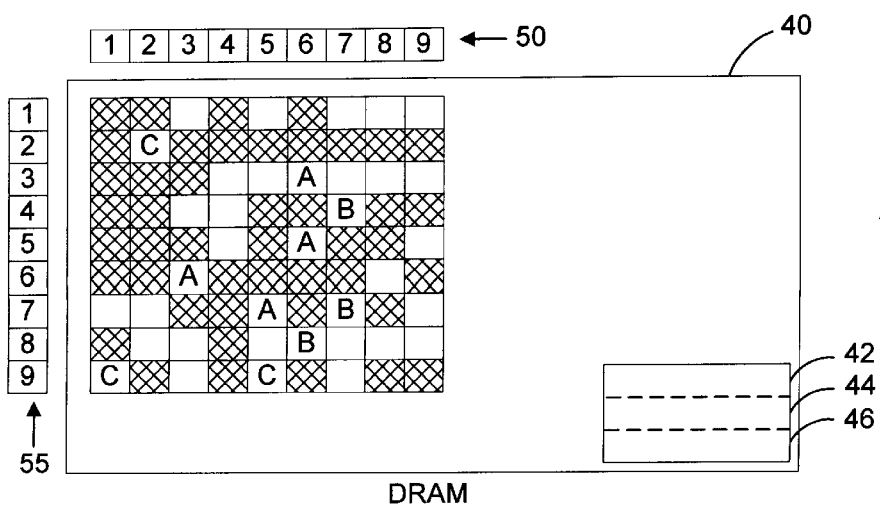

FIG. 2C depicts memory 40 at a third instance in time wherein a third rasterized and compressed page strip "C" has also been distributed and linked therein at holes identified at coordinate reference locations 2/2, 1/9, and 5/9. In this instance, previously used memory portions 5/8 and 7/8 have been freed up due to some reallocation of resources by printer 25. Again, it is easily seen how the distributed segment of page strip "B" that is located at 6/8 is undesirably fragmenting row 8.

In these simple illustrations, it is clear now that memory 40 is fragmented due to distributed segments of page strips "A" and "B" at locations 6/3 and 6/8. However, advantageously, the present invention reduces this memory fragmentation for enabling enhanced processing by printer 25. Stated generally, this fragmentation is reduced by first coalescing page strips "A", "B" and "C" into pre-allocated buffers 42–46, thereby freeing up those fragmented areas 6/3 and 6/8 as will be shown with respect to FIGS. 3A–B, and then redistributing those strips back into the smaller holes in memory 40 as will be shown with respect to FIG. 3C.

Figure 3A:
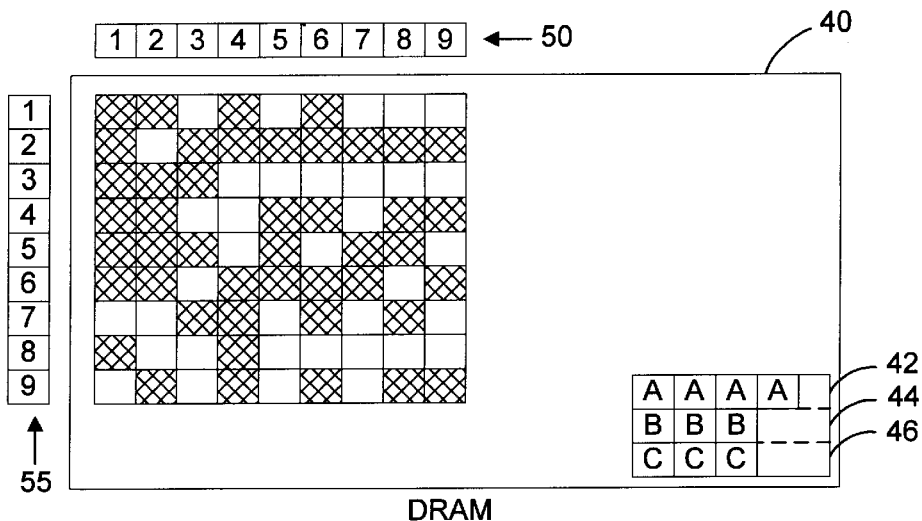
FIGS. 3A–B are block diagrams representing a memory having coalesced page strips according to the present invention.

Thus, referring now to FIG. 3A, each page strip "A", "B" and "C" is shown as having been removed from main memory 40 and coalesced into pre-allocated buffers 42–46 of memory 40. This step frees up those areas of memory 40 that were previously used by the distributed segments of the strips. Although each strip is shown as being coalesced into a separate buffer 42–46, it is obvious that the strips may be coalesced into a single buffer at least until that buffer is filled, and only then would the next buffer be used to continue coalescing. Importantly, however, as many strips as possible are removed from memory 40 and placed into the buffers (to fill the buffers), in order to reduce fragmentation as much as possible, prior to redistributing the strips (discussed later).

Figure 3B:
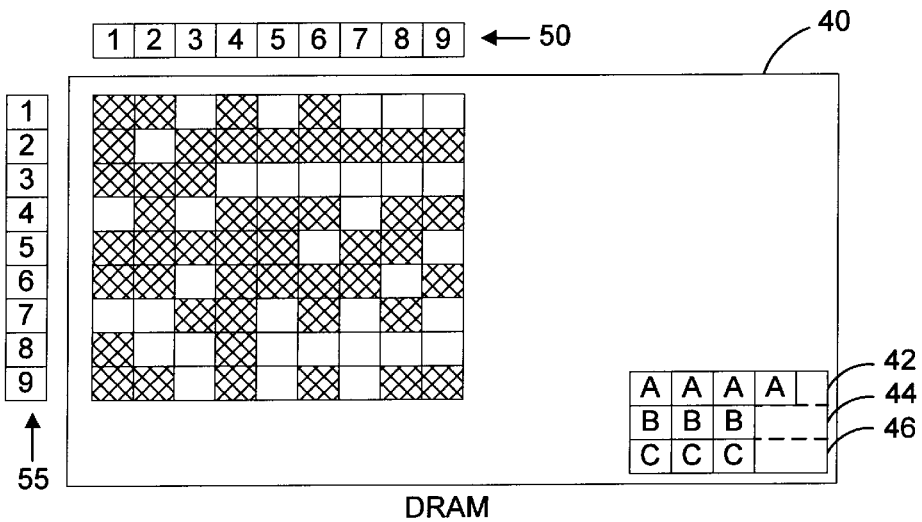

FIG. 3B depicts how other transactions have occurred in memory 40 relative to some aspect of printer 25. Specifically, location 1/4 is now freed up, and locations 4/4, 4/5 and 1/9 are now in use. Again, these transactions are shown simply to depict possibilities of activities that occur in memory 40 and that, in this example, occurred either while page strips "A", "B" and "C" were being coalesced into buffers 42–46, or occurred immediately thereafter.

Figure 3C:
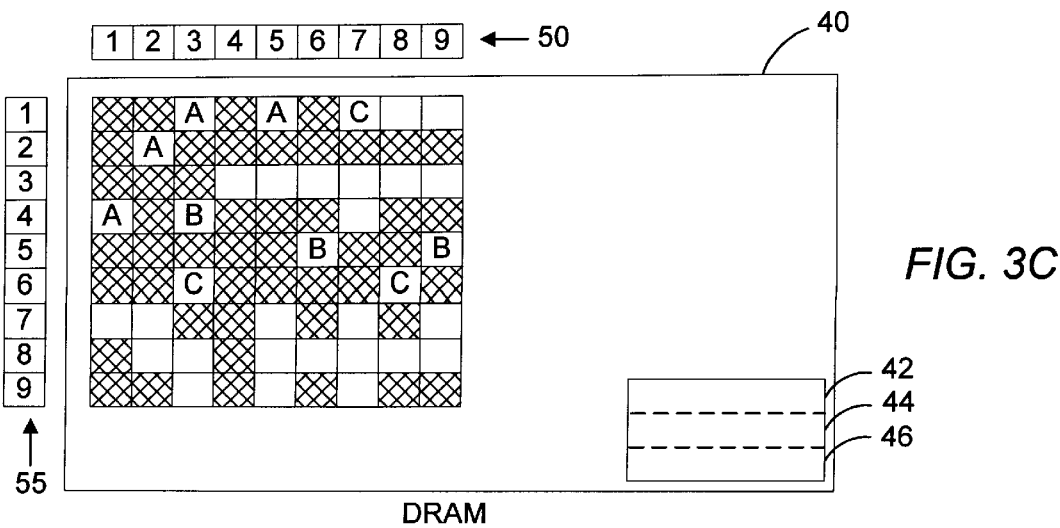
FIGS. 3C is a block diagram representing a memory having redistributed page strips according to the present invention.

FIG. 3C depicts memory 40 after each page strip "A", "B" and "C" has been redistributed back into memory 40 from buffers 42–46 according to principles of the present invention. The page strips are redistributed back into memory 40 by looking for and placing the strips into smaller free areas first, and then into larger free areas as the smaller areas are used up. This enables memory 40 to remain as defragmented as possible. For example, as shown, strip "A" was distributed into small locations 3/1, 5/1, 2/2 and 1/4, and strip "B" was distributed to 3/4, 6/5 and 9/5, and the first two segments of strip "C" were distributed to 3/6 and 8/6. However, since all the smaller locations (represented by the single and completely isolated free spaces) were used up, the final segment of strip "C" was distributed into a next larger area located at 7/1. In the example, total free space size for determining a next larger area is represented by the total number of connecting free spaces in any direction.

Preferably, as many page strips as possible are removed from memory 40 as will fit (coalesced) into the pre-allocated buffers 42–46 simultaneously before any of those strips are redistributed back into memory 40. Subsequently, another set of as many strips as will fit into the buffers are coalesced and then redistributed back into memory 40. This process occurs as often as needed until all strips have been coalesced and redistributed. Since the page strips are compressed, then the compression ratio, the size of the original strips, and the number of buffers (and/or pre-allocated memory blocks) that are available for use will affect how many strips can be coalesced before they must be redistributed back into the memory.

Figure 4:
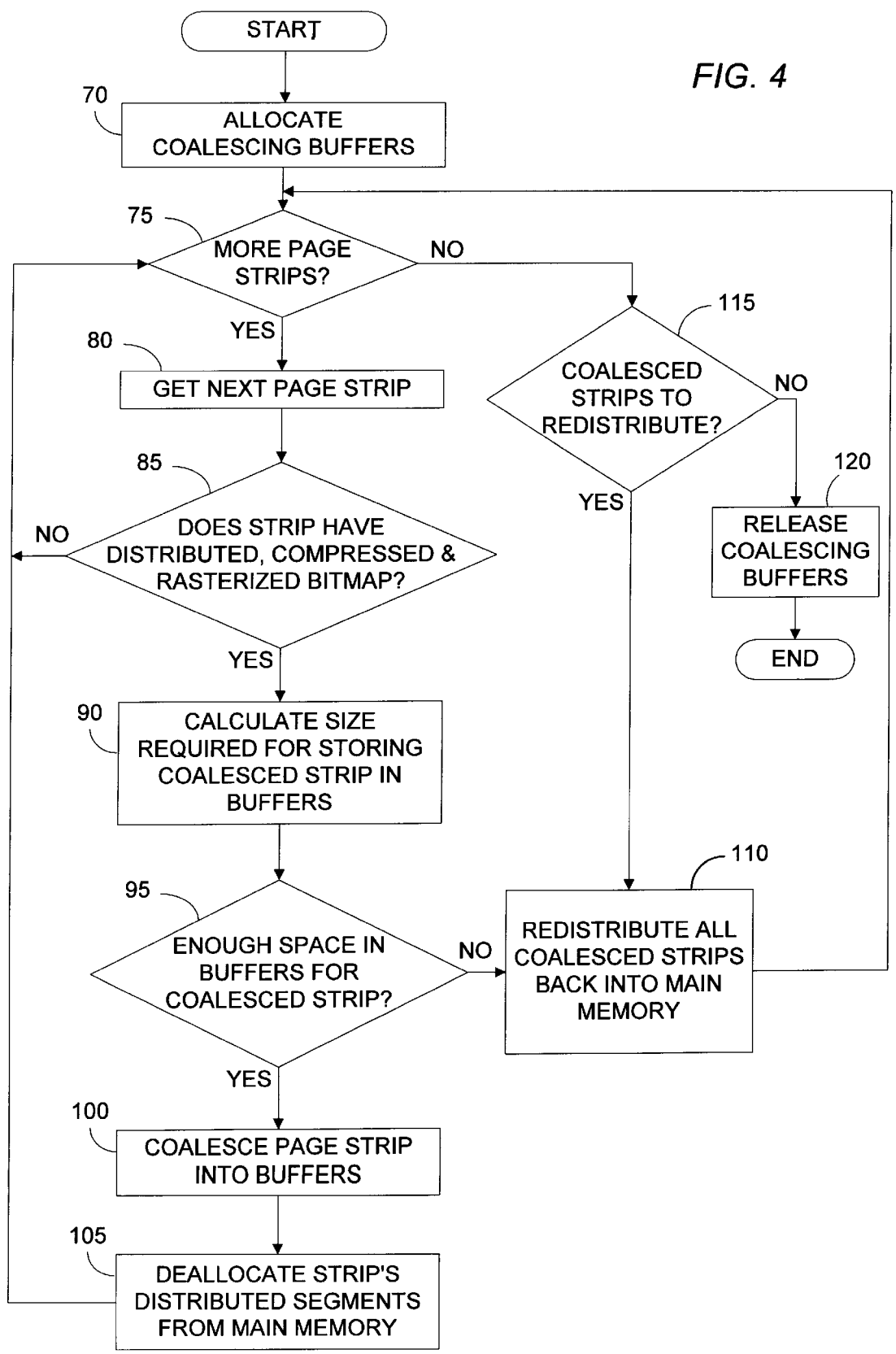
FIG. 4 is a flow chart depicting a preferred method of the present invention.

Referring now to FIG. 4, a flow chart depicts a preferred method of the present invention. First, 70, all buffers that will be used in coalescing the page strips are pre-allocated, such as video buffers 42–46 or other designated chunks of memory 40. Next, if there are page strips to process 75, then the next strip is obtained 80 and evaluated 85 to determine if it has a compressed and rasterized bitmap distributed within memory 40. If not, then the next strip is obtained 80 and likewise evaluated 85. If the strip is distributed, then its coalesced size is calculated 90 for storing in buffers 42–46. Then, if there is enough buffer space 95, the strip is coalesced into the appropriate buffer 100 and then that strip is deallocated 105 from memory (not from buffers 42–46). The next strip is then obtained 75, 80 for continued coalescing.

Once the buffer space 42–46 has been used up with the coalesced strips 95, then it is time to redistribute those coalesced strips 110 back into memory 40. As mentioned, the strips are redistributed into holes starting with the smaller holes first and then into larger holes as the smaller ones are used up. After all coalesced strips are redistributed back into memory, then more strips are obtained 75, 80, and the process of coalescing and redistributing repeats as strips are available.

Finally, when there are no more page strips to process 75, but if coalesced strips remain to be redistributed 115, then those remaining in buffers 42–46 are redistributed 110. On the other hand, if there are no more strips to process 75, and there are no coalesced strips remaining to be redistributed 115, then the coalescing buffers 42–46 are released 120 and image processing continues its course as known in the art. Fragmentation has been reduced.

Thus far, the description has been focused on reducing fragmentation by first coalescing and then redistributing the already distributed rasterized and compressed page strips. However, in an alternate embodiment, and in reference to FIGS. 1 and 3A–C, fragmentation is reduced by storing the rasterized and compressed page strips directly into preallocated buffers 42–46 prior to ever distributing the strips to memory 40. Then, when the buffers are filled (or there are no more strips for distribution), the strips are dissected and distributed into memory 40 such that the smaller holes in the memory are filled before the larger holes.

This alternative method of the present invention reduces fragmentation in memory 40 because areas of memory 40 are freed up while the multiple rasterized strips are being stored in buffers 42–46. For example, the display lists of those strips that are being rasterized and stored in the buffers are released from memory 40 thereby creating more free space in the memory. This process of filling the buffers with the rasterized and compressed strips and then distributing them into holes in the memory is repeated for all rasterized and compressed strips of a page.

What has been described above are the preferred embodiments of a method and apparatus for reducing memory fragmentation in a printer. It will be obvious to one of ordinary skill in the art that the present invention is easily implemented utilizing any of a variety of software, firmware and/or hardware components existing in the art. Moreover, while the present invention has been described by reference to specific embodiments, it will be apparent that other alternative embodiments and methods of implementation or modification may be employed without departing from the true spirit and scope of the invention.

What is claimed is:

1. A method of reducing fragmentation in a first memory, comprising:
   (a) removing a subset of data from the first memory; and,
   (b) redistributing the subset of data back into the first memory such that fragments of the subset of data fill smaller holes in the first memory before filling larger holes.

2. The method of claim 1 wherein the first memory is in an imaging device.

3. The method of claim 2 wherein the subset of data includes fragments of rasterized page strips.

4. The method of claim 3 further including coalescing the fragments of rasterized page strips in at least a second memory prior to redistributing back into the first memory.

5. The method of claim 4 wherein the first memory is a main memory and the at least a second memory includes at least one video buffer of the imaging device.

6. The method of claim 1 further including temporarily storing the subset of data in at least a second memory prior to redistributing back into the first memory.

7. The method of claim 1 further including coalescing the subset of data in at least a second memory prior to redistributing back into the first memory.

8. A method of reducing fragmentation in a first memory of an image transfer device, the first memory having fragments of rasterized page strips distributed therein, the method comprising:
   (a) coalescing the fragments of a subset of the rasterized page strips into respective whole strips; and,
   (b) redistributing the respective whole strips back into the first memory in fragments such that the fragments fill smaller holes in the first memory before filling larger holes.

9. The method of claim 8 further including coalescing the fragments of the subset of the rasterized page strips in at least a second memory prior to redistributing back into the first memory.

10. The method of claim 9 wherein the first memory is a main memory and the at least a second memory includes at least one video buffer of the imaging device.

11. A computer-readable medium having computer-executable instructions for performing steps including:
    (a) removing a subset of data from a first memory; and,
    (b) redistributing the subset of data back into the first memory such that fragments of the subset of data fill smaller holes in the first memory before filling larger holes.

12. An image forming device comprising:
    (a) a first memory in communication with a print engine;
    (b) means for removing a subset of data from the first memory; and,
    (c) means for redistributing the subset of data back into the first memory such that fragments of the subset of data fill smaller holes in the first memory before filling larger holes.

13. The image forming device of claim 12 further including a second memory for storing the subset of data upon removing the subset of data from the first memory.

14. The image forming device of claim 13 wherein the subset of data includes fragments of rasterized page strips.

15. The image forming device of claim 14 further including means for coalescing the fragments of rasterized page strips in the second memory prior to redistributing back into the main memory.

16. A method of reducing fragmentation in a memory of an image forming device, the method comprising:
    (a) storing a plurality of rasterized page strips into at least one preallocated buffer; and, then,
    (b) distributing segments of the page strips that are stored in the at least one preallocated buffer into the memory such that the segments fill smaller holes in the memory before filling larger holes.

17. The method of claim 16 wherein the plurality of rasterized strips are compressed.

18. A computer-readable medium having computer-executable instructions for performing steps including:
    (a) storing a plurality of rasterized page strips into at least one preallocated buffer in an imaging device; and, then,
    (b) distributing segments of the page strips that are stored in the at least one preallocated buffer into a memory of the imaging device such that the segments fill smaller holes in the memory before filling larger holes.

* * * * *